United States Patent
Raykowski

(10) Patent No.: US 11,047,316 B2
(45) Date of Patent: Jun. 29, 2021

(54) METHOD OF ICE REMOVAL BY INDUCING SUDDEN VARIATION OF ROTOR SPEED IN A GAS TURBINE ENGINE

(71) Applicant: PRATT & WHITNEY CANADA CORP., Longueuil (CA)

(72) Inventor: Alex Raykowski, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 268 days.

(21) Appl. No.: 16/378,727

(22) Filed: Apr. 9, 2019

(65) Prior Publication Data
US 2020/0325830 A1   Oct. 15, 2020

(51) Int. Cl.
*F02C 9/32* (2006.01)
*F01D 25/02* (2006.01)

(52) U.S. Cl.
CPC ............... *F02C 9/32* (2013.01); *F01D 25/02* (2013.01); *F05D 2220/32* (2013.01); *F05D 2270/09* (2013.01)

(58) Field of Classification Search
CPC ...... F02C 9/26; F02C 9/32; F02C 9/28; F02C 9/266; F02C 9/46; F01D 25/02; F05D 2270/02; F05D 2270/04; F05D 2270/09; F05D 2270/11; F05D 2270/303; F05D 2270/304
See application file for complete search history.

(56) References Cited

U.S. PATENT DOCUMENTS

| | | | |
|---|---|---|---|
| 9,239,011 B2 | 1/2016 | Jones | |
| 2016/0273550 A1* | 9/2016 | Clarkson | F04D 29/526 |
| 2018/0010527 A1* | 1/2018 | Rowe | B64D 15/20 |
| 2018/0230853 A1 | 8/2018 | Jastrzembowski et al. | |
| 2020/0247552 A1* | 8/2020 | Lisio | F02C 6/206 |

FOREIGN PATENT DOCUMENTS

| | | | | |
|---|---|---|---|---|
| WO | 2010132086 | | 11/2010 | |
| WO | WO-2010132086 A1 | * | 11/2010 | ......... F04D 27/0292 |

* cited by examiner

*Primary Examiner* — Scott J Walthour
*Assistant Examiner* — Todd N Jordan
(74) *Attorney, Agent, or Firm* — Norton Rose Fulbright Canada LLP

(57) ABSTRACT

The method can include, in sequence: varying the flow rate of fuel from the first flow rate to a second flow rate, thereby varying the rotor speed from a first speed to a second speed, varying the flow rate of fuel back to the first flow rate, and rotating the rotor at the first speed for a given period of time.

14 Claims, 3 Drawing Sheets

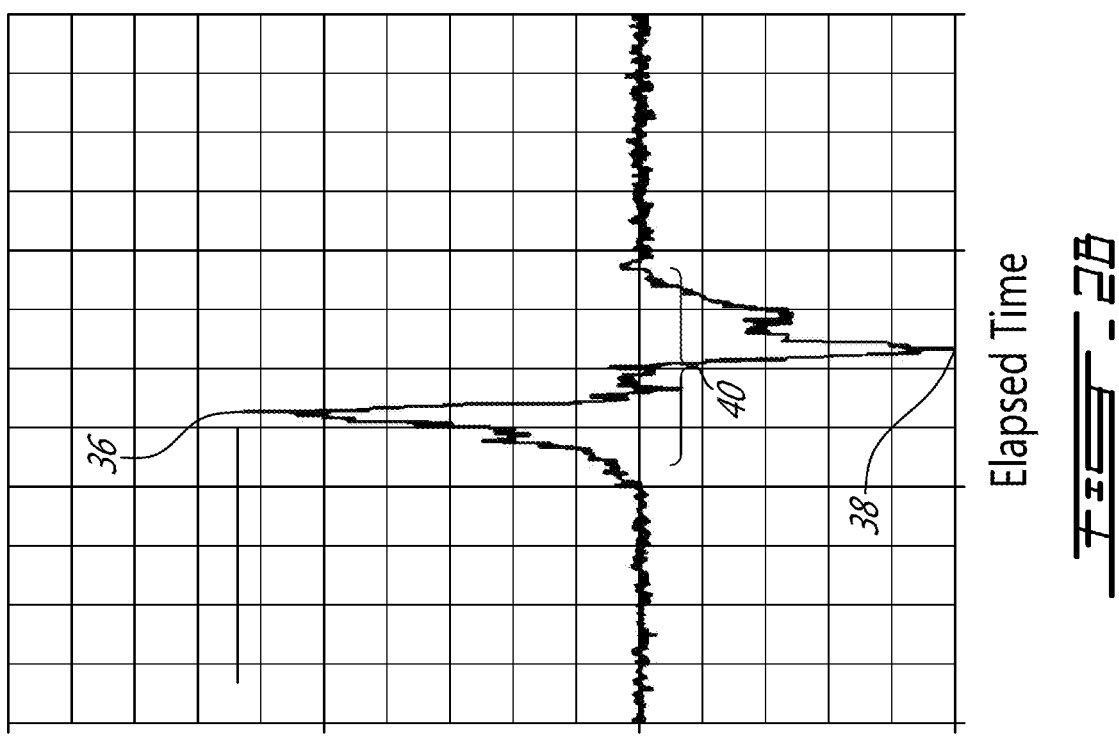
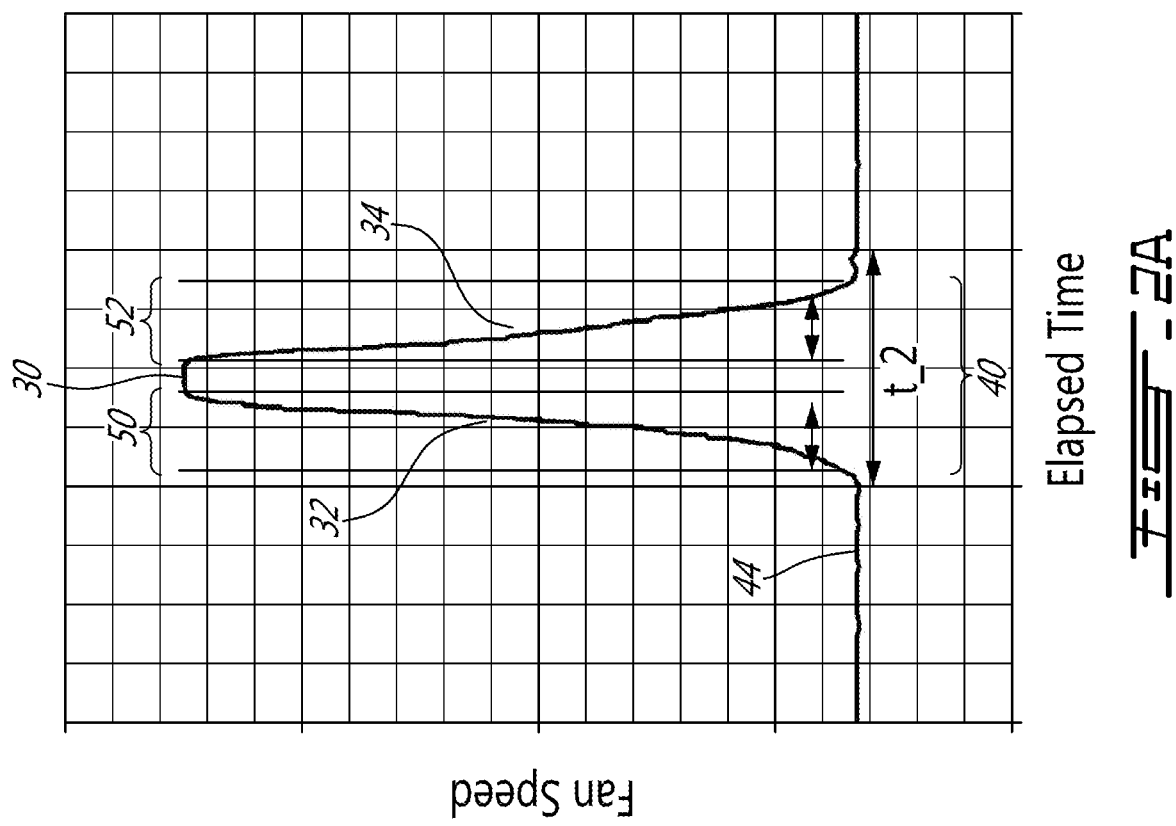

METHOD OF ICE REMOVAL BY INDUCING SUDDEN VARIATION OF ROTOR SPEED IN A GAS TURBINE ENGINE

TECHNICAL FIELD

The application related generally to gas turbine engine and, more particularly, to a method of operation therefor.

BACKGROUND OF THE ART

Certain combinations of atmospheric conditions can lead to the accumulation of ice on aircraft engine components. While aircraft gas turbine engines are typically designed in a manner to limit the impact of this phenomena, there remains room for improvement.

SUMMARY

In one aspect, there is provided a method of operating a gas turbine engine having in serial flow communication a compressor section, a combustor, a turbine section, a fuel system configured for feeding a controlled flow rate of fuel to the combustor, and a compressor rotor of the compressor section having compressor blades, the method comprising varying the flow rate of fuel in the form of a sudden, discrete pulse to cause a sudden variation of rotation speed and, in turn, a shock to the compressor blades, the discrete pulse including: varying the flow rate of fuel from a first flow rate to a second flow rate to vary a speed of the rotor from a first speed to a second speed, and varying the flow rate back to the first flow rate; and further comprising, subsequently to the pulse, rotating the rotor at the first speed for a given period of time.

In another aspect, there is provided a computer program product stored in a non-transitory memory, the computer program product comprising computer-readable instructions for controlling a flow rate of fuel supplied to a combustor of a gas turbine engine, the computer-readable instructions comprising steps for varying the flow rate of fuel from the first flow rate to a second flow rate, and thereby varying the speed of a rotor of the gas turbine engine to a second speed, varying the flow rate of fuel back to the first flow rate, and rotating the rotor at the first speed for a given period of time prior to repeating said steps of varying.

In accordance with another aspect, there is provided a method of operating a gas turbine engine having in serial flow communication a compressor section, a combustor, a turbine section, a fuel system configured for feeding a controlled flow rate of fuel to the combustor, the method comprising: receiving an indication that vibrations are occurring in the engine; and varying the flow rate of fuel in a manner to cause sudden variations of rotor speed, the sudden variations of rotor speed being configured to counteract the vibrations indicated to be occurring in the engine. More specifically, the sudden variations of rotor speed can be spikes, and the magnitude, duration and frequency of spikes can be configured to disrupt a resonance condition causing the vibrations.

DESCRIPTION OF THE DRAWINGS

Reference is now made to the accompanying figures in which:

FIGS. 2A and 2B are graphs illustrating an occurrence of a RPM pulse, with FIG. 2A plotting speed against time and FIG. 2B plotting acceleration against time, in accordance with an embodiment;

DETAILED DESCRIPTION

Figure 1:
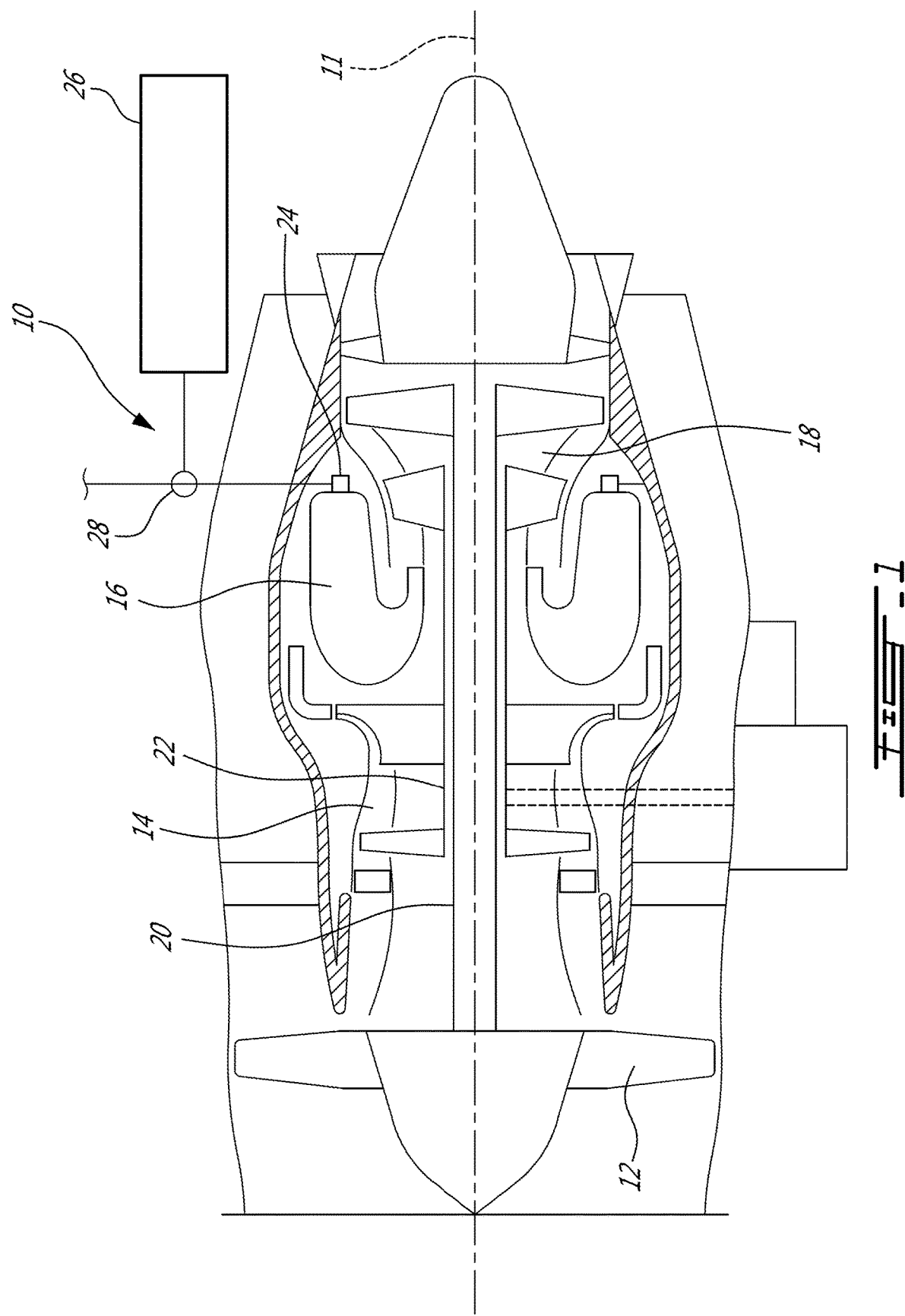
FIG. 1 is a schematic cross-sectional view of a gas turbine engine.
Figure 3B:
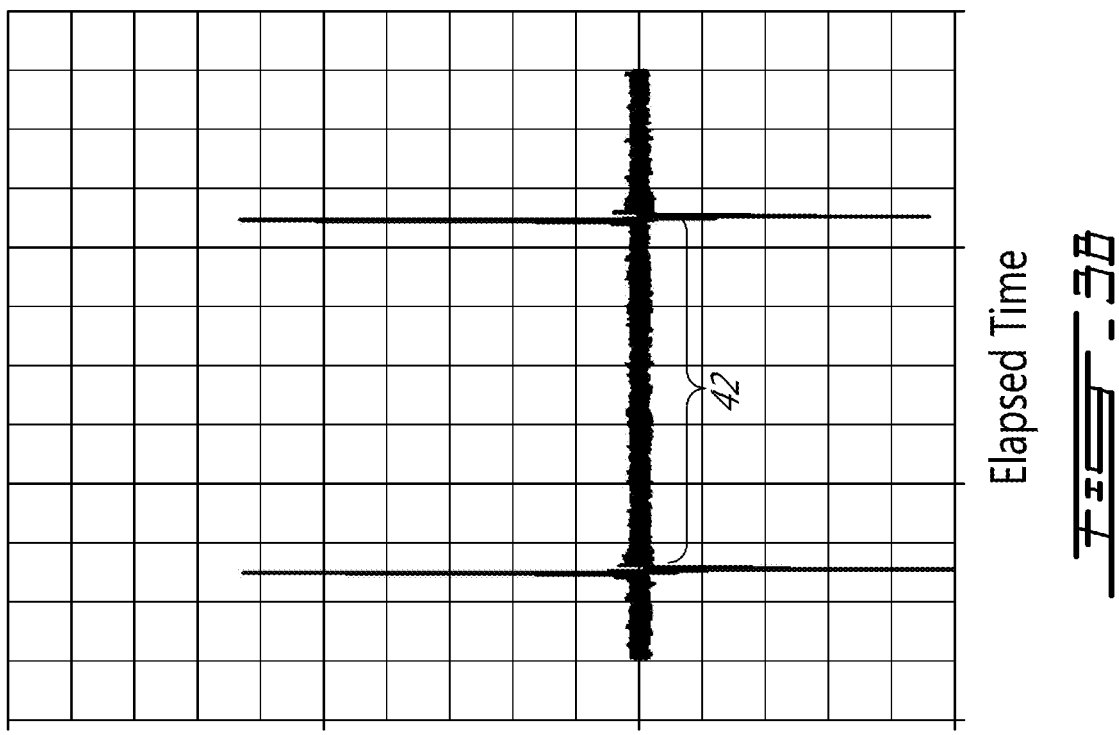
FIGS. 3A and 3B are graphs similar to FIGS. 2A and 2B, but illustrating two subsequent, intermittent, RPM pulses separated from one another in time by a non-spike period.
Figure 3A:
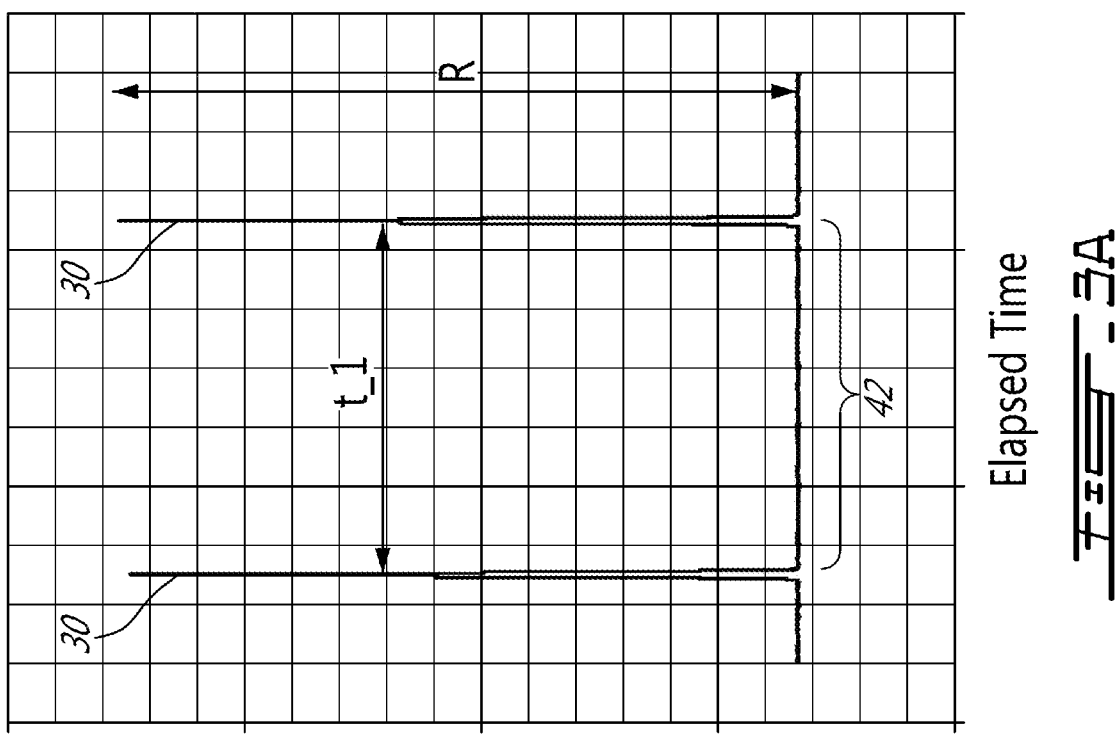

FIG. 1 illustrated a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

The gas turbine engine can include one or more rotors 20, 22 which each can have blades of one or more of the fan 12, the compressor section 14 or the turbine section 18. In this embodiment, the gas turbine engine 10 includes a low pressure rotor 20 including fan blades and second turbine stage blades, and a high pressure rotor 22 including compressor blades and first turbine stage blades, but other embodiments can have a different amount of rotors. The rotors 20, 22 can include shafts which receive the blades and which are mounted to non-rotating engine components (e.g. engine casing) via bearings.

The combustor 16 can have a fuel feed outlet 24, such as a plurality of circumferentially interspaced fuel nozzles, and can also include one or more igniter allowing to ignite the fuel and air mix inside a combustor liner. The flow rate of fuel into the combustor liner can be controlled, and its variation impacts the rotating speed of the rotors. In modern engines, fuel control typically involves a controller 26, such as an engine control device, which can typically be considered a computer, but some engines can have more rudimentary hardware for fuel control, such as functions implemented by solid state electronics for instance. Varying the fuel flow rate into the combustion chamber can require a fuel flow rate control device in the form of one or more fuel pump and/or variable aperture valves, either of which can be controlled by the controller 26, and the flow rate outputted from a plurality of fuel nozzles can be controlled individually or collectively. In this embodiment, the fuel flow rate control device has a variable aperture valve 28 controlled by the controller 26.

The fuel flow rate control device is configured to allow a discrete variation of fuel flow characterized by a sharp change from an initial fuel flow rate followed by an immediate sharp return to the initial fuel flow rate, which will be referred to herein as a fuel pulse, or fuel spike. The fuel pulse can be discrete in the sense that it is clearly identifiable when considering its sharpness relative to the constancy of the fuel flow rate before and after the spike. The sharp variation of fuel flow rate is designed to generate a consequently sharp variation of rotor speed, referred to herein as a rotor speed pulse 30, an example of which is shown in FIG. 2A. The sharp variation of rotor speed can be configured to cause a shock in the compressor blades. The variation can be positive (i.e. increase in fuel flow rate and RPM) or negative (i.e. decrease in fuel flow rate and RPM), as either can, cause a shock to the rotor which can lead to dislodging and subsequent shedding ice accumulated onto the rotor and blades. Shedding ice accumulation early, while the ice layer is still relatively thin, can be preferable to shedding the ice accumulation later. A thicker ice layer being is more prone to damaging to the engine structure and/or affecting performance, for instance.

In an example embodiment, the discrete fuel pulse can be repeated intermittently, separated by non-pulse, or pulse-free, periods, to achieve a satisfactory effect, such as ice shedding. The non-pulse periods can be of significantly larger duration in comparison to the duration of the pulse.

Since the fan blades are a known area of potential ice accumulation, the control of the fuel pulses can be specifically designed to target fan blade ice accumulation in one embodiment. But it will be understood by persons having ordinary skill in the art that fuel pulses can be designed to target other areas of ice accumulation.

More specifically, in the example presented in FIG. 2A, it will be noted that the rotating speed pulse includes a sequence of surge 32 and immediate drop 34 of RPM velocity, caused by a corresponding surge and immediate drop of fuel flow rate. When viewed in terms of rotor acceleration and deceleration over time, such as shown in FIG. 2B, as opposed to simply RPM variations over time, it will be noted that the rotor pulse 30 actually includes two shocks, a first one associated with an occurrence of sharp acceleration 36, and a second one associated with an occurrence of sharp deceleration 38.

It will be understood that a comparable sharp reduction in RPM followed by a sharp return to the initial RPM, can produce a similar sequence of shocks, but in the reverse order, and achieve a comparable result in terms of ice shedding, for instance. As a variant, in some embodiments, a single sudden increase, or sudden decrease in RPM, could be susceptible to achieve a reasonable effect on ice shedding without necessitating the subsequent opposite variation in RPM, however, in the embodiment presented herein, it is intended to quickly return to the rotation speed preceding the sharp increase or decrease in RPM causing the initial shock to the rotor and specifically to the accumulated ice via the sharp change of centrifugal force magnitude acting on the adhered to blades layers of ice, with a view of minimizing engine operation disruption and limiting it, as much as possible, to the creation of a shock, or intermittent shocks, specifically targeting ice accretion.

In an alternate embodiment, a half of total magnitude positive spike can be immediately followed by a negative total magnitude spike and then another half of total magnitude positive spike bringing RPM back to its initial value, instead of returning to the initial RPM immediately after the initial surge or drop of RPM, or oppositely, a half of total magnitude negative spike can be immediately followed by a positive spike and then another half of total magnitude negative spike, for instance.

In this context, it will be understood that the pulse, or subsequent discrete intermittent pulses, can be triggered by the controller based on, or more specifically contingent upon, receiving an indication that ice has accumulated, or is accumulating on the rotor. Such an indication may be received from the aircraft monitoring system for instance, which may determine the occurrence of icing conditions based on atmospheric conditions such as humidity, temperature, pressure, etc.

In this specification, the period of time between the moment when the RPM begins its initial variation and the moment when the RPM returns to its initial value will be referred to as pulse periods 40, and the period of time between subsequent pulses will be referred to as non-pulse, or pulse-free, periods 42.

The exact shape of the fuel flow rate variation over time during a given pulse, as viewed on a graph, for a specific embodiment, can be selected based on the specific engine design, and include factors such as engine size, amount of stress induced into the blades, expected rate of ice accretion, expected natural speed of ice shedding (shedding without fuel spikes), etc.

The duration of a pulse period can be referred to as pulse duration $t\_2$. In one embodiment, the pulse duration $t\_2$, was limited to within two seconds, and the number of pulses per minute was selected to be less than 10, preferably less than 5. In one embodiment, the pulse duration $t\_2$ was limited to between ¾ of a second to 1.5 seconds, preferably between 1 second to 1.5 second. In one embodiment, the pulses 30 were regularly repeated at a rate of 2 to 5 pulses per minute. The latter pulse duration $t\_2$ and rate of repetition are regarded to provide ice shedding efficiency while limiting side effects on the gas turbine engine in a satisfactory manner in an embodiment. The rate of repetition can be related to the duration $T\_1$ of non-pulse periods 42.

Turning to FIG. 2, one possible embodiment of a pulse will be analysed in greater detail. In the pulse shown in FIG. 2A, the pulse follows a period of stable RPM of pre-pulse magnitude. It will be understood that in a period of stable RPM between pulses, the RPM can vary to a certain extent, but the amplitude of such variation can be relatively lower compared to the amplitude and duration of the pulse. The pulse 30 begins by a period 50 of sharp increase in RPM, characterized, in FIG. 2B, by a corresponding peak of acceleration 36. The period 50 of sharp increase in RPM has a duration of less than ¾ of a second in this embodiment, and can also have a period of less than ½ of a second, for instance. This peak of acceleration creates a first shock. The period 50 of sharp acceleration 32 is followed by a period of sharp deceleration 52, characterized by a corresponding peak of deceleration 38 in FIG. 2B. This sharp deceleration 38 is associated with a second, opposite shock. The period of sharp deceleration 52 can have a duration of less than ¾ of a second in this embodiment, and can also have a duration of less than ½ of a second, for instance. The pulse 30 is followed by a non-pulse period 42. The non-pulse periods 42 can be characterized by RPM variations having ratios of amplitude over time which are limited to significantly less than the ratios of amplitude variation over time which occur during the successive shocks. In other words, while the RPM can be of some variation during the non-pulse period, such as to adapt to different aircraft operating conditions, such variation will be very non-remarkable, if any, when compared to the sudden changes occurring during the pulse 30. For instance, the ratios of amplitude variation over time during non-pulse periods can be less than $⅕^{th}$, or even less than $⅒^{th}$ or $1/50^{th}$, or even less still, of the ratios of amplitude variation over time which occur during the shocks during the pulse. To characterise a time discreteness of the introduced pulses for instance, the ratios the non-pulse periods duration to the pulse periods duration can be defined within a range of 5 to 20 or even more.

Looking at FIG. 2A more closely, it will be understood that the initial rise in RPM characterizing the beginning 32 of the pulse 30, can stem from a corresponding, sharp, rise in fuel flow rate to the combustor 16. Similarly, the subsequent fall in RPM characterizing, in this example, the end 34 of the pulse 30 can stem from a corresponding, sharp, reduction in fuel flow rate to the combustor, which has the effect of returning the RPM to its initial speed. The speed of the rotor is then maintained constant for a given period of time of a non-pulse period, and while it may progressively increase or decrease in order to adapt to varying aircraft operation conditions during the non-pulse period, it can do so at one or more order of magnitude less suddenly than the sudden RPM variations characterizing the pulse portion.

The amplitude of the sharp rotation speed variations characterizing the pulse can be selected as a function of the details of specific embodiments. In one embodiment, it was decided to limit the amplitude of the rotation speed variation of the pulse to within 10% of the rotation speed preceding the pulse, in a manner to limit the potential impact on the engine or aircraft operation. On the other hand, in order to produce a significant ice shedding effect, it can be desired to maximize the rotation speed variation of the pulse within operational reasoning and any other consideration. Accordingly, the rotation speed variation of the pulse can be of at least 2% of the initial RPM in one embodiment. Alternately, the rotation speed variation of the pulse can be of between 5 and 10% of the initial RPM in one embodiment.

In an embodiment using a sequence of discrete intermittent pulses, the rate of repetition of the pulses, or conversely, the non-pulse duration 42, can be adapted as a function of the specific embodiment considered.

Two ratios can receive particular attention in adapting a design to a specific embodiment. The first one of these two ratios is the ratio of pulse magnitude to pulse duration. In one embodiment considering pulse magnitude in RPM and pulse duration in seconds, the ratio can be between 100 and 400, or between 150 and 300. The second one of these two ratios is the ratio of non-pulse pulse period duration to pulse duration, in intermittent pulse applications. In one embodiment, this latter ratio was of between 15 and 30.

In intermittent pulse applications (i.e. embodiments where multiple pulses are separated by non-pulse periods), the period of time during which pulses are discretely and intermittently induced can vary depending on the exact embodiment. In one embodiment, the period of time of intermittent pulsating was of between 1 minute and 10 minutes. The period of time of intermittent pulsating can more specifically be between 3 and 4 minutes in some embodiments. The exact duration of the pulsating effect can be selected as a function when ice is expected to have been shed, such as based on experimentation or computer simulation with a specific engine design also accounting for the engine operation in the conditions of ice accretion, for instance.

In one embodiment, the pulses can be controlled by a computer, via a computer program product stored in non-transitory storage media. Based on the program, the computer can control the fuel flow rate such as by controlling the degree of opening of a valve or by controlling a fuel pump, for instance. The program can specify various features associated to the pulse or pulses, and can also specify features of non-pulse periods, for instance. The program can be designed in order to allow for an input indicative of icing conditions, and the generation of pulses can be contingent upon, among potentially other factors, the input indicative of icing conditions. The duration of the pulsating period, in an intermittent pulse application, can also be affected, among other factors, by an input indicative of icing conditions.

It will be understood that the expression "computer" as used herein is not to be interpreted in a limiting manner. It is rather used in a broad sense to generally refer to the combination of some form of one or more processing units and some form of non-transitory memory system accessible by the processing unit(s). The use of the expression "computer" in its singular form as used herein includes within its scope the combination of a two or more computers working collaboratively to perform a given function. Moreover, the expression "computer" as used herein includes within its scope the use of partial capacities of a processing unit of an elaborate computing system also adapted to perform other functions. Similarly, the expression "controller" as used herein is not to be interpreted in a limiting manner but rather in a general sense of a device, or of a system having more than one device, performing the function(s) of controlling one or more device, such as a valve or pump for instance.

It will be understood that the various functions of a computer or of a controller can be performed by hardware or by a combination of both hardware and software. For example, hardware can include logic gates included as part of a silicon chip of the processor. Software can be in the form of data such as computer-readable instructions stored in the memory system. With respect to a computer, a controller, a processing unit, or a processor chip, the expression "configured to" relates to the presence of hardware or a combination of hardware and software which is operable to perform the associated functions.

In an embodiment, a controlled fuel spiking logic can be employed while utilising an engine data acquisition system, for instance. In one embodiment, the computer can be the engine's control system, for instance.

The above description is meant to be exemplary only, and one skilled in the art will recognize that changes may be made to the embodiments described without departing from the scope of the invention disclosed. In some alternate embodiments, the pulses can be used in events related to flutter and/or surge rather than in events related to icing. For instance, a resonance/vibrations indicative of flutter or surge can be detected, and based on the detected vibrations, the fuel flow rate can be varied to cause vibrations or shocks of one or more rotors, the vibrations or shocks being configured to counter the resonance or vibrations caused by flutter or surge. Still other modifications which fall within the scope of the present invention will be apparent to those skilled in the art, in light of a review of this disclosure, and such modifications are intended to fall within the appended claims.

The invention claimed is:

1. A method of operating a gas turbine engine with discrete pulses in fuel flow causing variations in rotation speed, the gas turbine engine comprising:
   a compressor section, the compressor section comprising a compressor rotor having compressor blades;
   a combustor;
   a turbine section;
   a fuel system, the fuel system configured to feed a controlled flow rate of fuel to the combustor; and
   a computer, the computer configured to control the controlled flow rate based on instructions stored in a non-transitory media;
   the method comprising:
   rotating the compressor rotor at a first speed for a period of time;
   the computer receiving a signal indicative that icing is occurring or has occurred on the compressor rotor;
   in response to the signal, the computer:
     varying the controlled flow rate of fuel in the form of a discrete pulse from a first flow rate to a second flow rate to cause a variation of rotation speed of the compressor rotor from the first speed to a second speed to shock the compressor blades; and
     varying the flow rate back to the first flow rate;
   wherein the variation of rotation speed of the compressor rotor from the first speed to the second speed is performed within less than one second, and wherein the second rotor speed is different from the first rotor speed by at least 2% of the first rotor speed.

2. The method of claim 1, wherein the signal is indicative that ice has accumulated on the compressor rotor.

3. The method of claim 1, wherein the variation of rotation speed of the compressor rotor from the first speed to the second speed is performed within less than three quarters of a second.

4. The method of claim 1 wherein the second rotor speed is different from the first rotor speed by between 5 and 10% of the first rotor speed.

5. The method of claim 1, wherein the period of time is at least 5 seconds.

6. The method of claim 5, wherein the period of time is at least 10 seconds.

7. The method of claim 1, wherein a ratio of a difference of the compressor rotor speed between the first speed and the second speed, in RPM, to a time elapsed between the varying of the compressor rotor speed from the first speed to the second speed and the return of the compressor rotor to the first speed, is between 100 and 400.

8. The method of claim 7, wherein the ratio is between 150 and 300.

9. The method of claim 1, further comprising discretely and intermittently repeating the method steps of:
rotating the compressor rotor at the first speed for a repetition time;
varying the controlled flow rate of fuel in the form of a discrete pulse from the first flow rate to the second flow rate to cause a variation of rotation speed of the compressor rotor from the first speed to the second speed to shock the compressor blades; and
varying the controlled flow rate back to the first flow rate.

10. The method of claim 9, wherein the repetition time is between 10 and 20 seconds.

11. The method of claim 9, wherein a ratio of the repetition time to an impulse time is of between 15 and 30, wherein the impulse time is the time elapsed between the variation of the compressor rotor speed from the first speed to the second speed and back to the first speed.

12. The method of claim 9, wherein the discreetly and intermittently repeating is performed for a duration of between 1 minute and 10 minutes.

13. The method of claim 12, wherein the discreetly and intermittently repeating is performed for a duration of between 1 minute and 4 minutes.

14. A computer program product for operating a gas turbine engine with discrete pulses in fuel flow causing variations in rotation speed,
wherein the computer program product is stored in a non-transitory memory, the computer program product comprising computer-readable instructions for controlling a flow rate of fuel supplied to a combustor of the gas turbine engine, wherein when the computer-readable instructions are executed by a processor of a computer in response to an input indicative that icing is occurring or has occurred on a compressor rotor of the gas turbine engine, the computer-readable instructions cause the processor to:
vary the flow rate of fuel in the form of a discrete pulse from a first flow rate to a second flow rate to cause a variation of rotation speed of the compressor rotor from a first speed to a second speed to shock the compressor blades; and
vary the flow rate back to the first flow rate;
wherein the variation of rotation speed of the compressor rotor from the first speed to the second speed is performed within less than one second, and wherein the second rotor speed is different from the first rotor speed by at least 2% of the first rotor speed.

* * * * *